United States Patent
Shaylor

(10) Patent No.: US 6,349,322 B1
(45) Date of Patent: Feb. 19, 2002

(54) FAST SYNCHRONIZATION FOR PROGRAMS WRITTEN IN THE JAVA PROGRAMMING LANGUAGE

(75) Inventor: Nik Shaylor, Newark, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/073,637

(22) Filed: May 6, 1998

(51) Int. Cl.[7] ................................................. G06F 9/52
(52) U.S. Cl. ....................................... 709/107; 709/316
(58) Field of Search ................................. 709/100–108, 709/310–332; 717/4, 5

(56) References Cited

U.S. PATENT DOCUMENTS

| | | | |
|---|---|---|---|
| 5,706,515 A | * | 1/1998 | Connelly et al. ........... 709/106 |
| 5,835,908 A | * | 11/1998 | Bennett et al. ............... 707/10 |
| 5,862,376 A | * | 1/1999 | Steele, Jr. et al. .......... 709/107 |
| 5,924,098 A | * | 7/1999 | Kluge ......................... 707/100 |
| 5,946,487 A | * | 8/1999 | Dangelo ........................ 717/5 |
| 5,970,242 A | * | 10/1999 | O'Connor et al. ............. 717/1 |
| 6,108,715 A | * | 8/2000 | Leach et al. ................ 709/330 |

* cited by examiner

Primary Examiner—St. John Courtenay, III
Assistant Examiner—George L. Opie
(74) Attorney, Agent, or Firm—Hogan & Hartson, LLP

(57) ABSTRACT

A method, system, and computer program product for synchronized thread execution in a multithreaded processor are described. Each synchronized thread refers to at least one object identified by an object identification (OID) that is shared among a plurality of synchronized threads. One of the synchronized threads is selected for execution. Upon entering the selected thread, an entry sequence indicates that the shared object should be locked by pushing its OID onto a lock stack. The operations defined by the selected thread are executed and the indication is removed by pushing the OID from the lock stack.

24 Claims, 4 Drawing Sheets

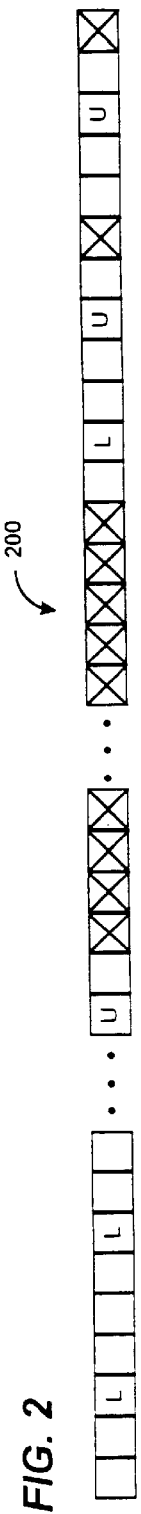

FAST SYNCHRONIZATION FOR PROGRAMS WRITTEN IN THE JAVA PROGRAMMING LANGUAGE

BACKGROUND OF THE INVENTION

1. Field of the Invention

The present invention relates, in general, to data processing, and, more particularly, to thread synchronization in JAVA language programs.

2. Relevant Background

The JAVA™ (a trademark of Sun Microsystems, Inc.) programming language, is an object-oriented programming language developed by Sun Microsystems, Inc., the Assignee of the present invention. The JAVA programming language has found success as a language and programming environment for networked applications. The JAVA programming language is attractive due to its many features, including standardized support for concurrent execution of program threads. The JAVA programming language's concurrency features are provided at both a language (syntactic) level and through a "threads" library. At the language level, an object's methods can be declared "synchronized". Methods within a class that are declared synchronized do not run concurrently and run under control of "monitors" to ensure that variables remain in a consistent state.

Each time a synchronized method is entered or exited, the JAVA language requires calls to the operating system (O/S) kernel to allocate thread synchronization resources. Calls to the kernel may require tens if not hundreds of instructions depending on the O/S in use. In comparison, the synchronized method itself may require only a few lines of code. As an example, a dictionary hash table method can be implemented with fewer than ten instructions, but to implement it as a synchronized method requires more than 100 instruction in a typical operating system. Hence, thread synchronization significantly adds to the execution time of many programs.

This overhead is required in programs that make heavy use of multi-threading and depend on thread synchronization. However, this overhead is undesirable in programs that are single-threaded. Similarly, even in multithreaded programs, a large number of the threads may in fact execute correctly without the synchronization overhead. Hence, a need exists for a thread synchronization mechanism that only incurs the overhead associated with O/S thread management resource allocation only when those resources are needed.

Operating systems conventionally enable multithreading in one of two ways: preemptable and non-preemptable. A preemptable thread operating system (e.g., Solaris and Windows/NT) include O/S techniques and devices that enable one thread to interrupt another concurrently executing thread. Hence, at any given time, an executing thread cannot predict whether it will continue to execute or whether it will be blocked by another thread. Hence, the application cannot manage thread synchronization on its own because it lacks visibility as to when threads will be blocked. Preemptable threads are also valuable in multiprocessing machines to efficiently distribute execution of threads across multiple processors.

Non-preemptable multithreading is an simpler form of multithreading that supports a mode of thread execution, whereby once a thread begins to execute, it cannot be blocked by another thread. A thread may halt or block itself, yield control to other threads, or be blocked by virtue of waiting for input/output (I/O) to complete. There remain a large number of applications that can be implemented as single threads and which do not require the preemptive multithreading features of an operating system. Non-preemptive operating systems will likely exist in information appliances and simpler operating systems for some time. Where the O/S ensures that each thread cannot be preempted, allocation of thread synchronization resources in the O/S increases program execution time with little benefit.

Multithreading takes advantage of parallelism inherent in (or designed into) many programs. However, legacy programs often exhibit little parallelism. Moreover, some programs by the nature of their behavior do not exhibit a high degree of parallelism. These programs are slowed by having to incur the overhead associated with multithreading operating systems without reaping any benefits because of their non-parallel structure. Hence, a need exists for a thread synchronization mechanism that speeds up execution in programs that are essentially un-threaded yet running on a multithreading operating system.

SUMMARY OF THE INVENTION

Briefly stated, the present invention involves a method for synchronized thread execution in a multithreaded processor. Each synchronized thread refers to at least one object identified by an object identification (OID) that is shared among a plurality of synchronized threads. One of the synchronized threads is selected for execution. Upon entering the selected thread, an entry sequence indicates that the shared object should be locked by pushing its OID onto a lock stack. The operations defined by the selected thread are executed and the indication is removed by pushing the OID from the lock stack.

The foregoing and other features, utilities and advantages of the invention will be apparent from the following more particular description of preferred embodiments of the invention as illustrated in the accompany drawings. Still other embodiments of the present invention will become readily apparent to those skilled in the art from the following detailed description, wherein is shown and described only the embodiments of the invention by way of illustration of the best modes contemplated for carrying out the invention. As will be appreciated, the invention is capable of other and different embodiments and several of its details are capable of modification in various obvious respects, all without departing from the spirit and scope of the present invention. Accordingly, the drawings and detailed description are to be regarded as illustrative in nature and not as restrictive.

BRIEF DESCRIPTION OF THE DRAWINGS

FIG. 2 shows a thread execution timeline of a first example thread;

FIG. 3 shows a thread execution timeline of a second example situation;

FIG. 4 shows a thread execution timeline of a third example situation;

FIG. 5 shows a thread execution timeline of a fourth example situation;

DETAILED DESCRIPTION OF THE PREFERRED EMBODIMENTS

In general, the present invention involves a method for handling synchronized threads in programs written in the JAVA programming language that postpones initiating the high-overhead thread synchronization structures until it is determined that they are needed to ensure program correctness. In other words, in many applications, particularly single-threaded programs, the application itself ensures that the programs are deterministic, and the high overhead associated with multi-threaded synchronization serves only to slow program execution. Accordingly, in accordance with the present invention implementation of complex synchronization mechanisms including full data structures is postponed such that they may in fact never be implemented.

Although the problems of thread synchronization are not unique to the JAVA programming language, some features of the JAVA programming language affect the problem. JAVA programming language synchronization involves an O/S assigned lock and monitor object that are created each time a program enters a method labeled "synchronized". The monitor object requires data structures that are quite large, including two queue headers, a counter, and an owner field. The size of these structures prohibits them being included in a standard object header. The present invention addresses this difficulty by avoiding the creation of these lock and monitor objects until they are necessary.

The present invention is described in terms of a JAVA programming environment implementation such as a JAVA virtual machine (JVM), just-in-time (JIT) compiler, or a compile time or run time mechanism that converts JAVA programming language code into another programming language. However, the present invention is useful in any programming language that enables statements or program objects to access multithreading features of an operating system. The present invention does not require changes to the programming language itself, but rather provides method for implementing a program such that the program is not forced to perform unnecessary O/S operations to support thread synchronization.

Figure 1:
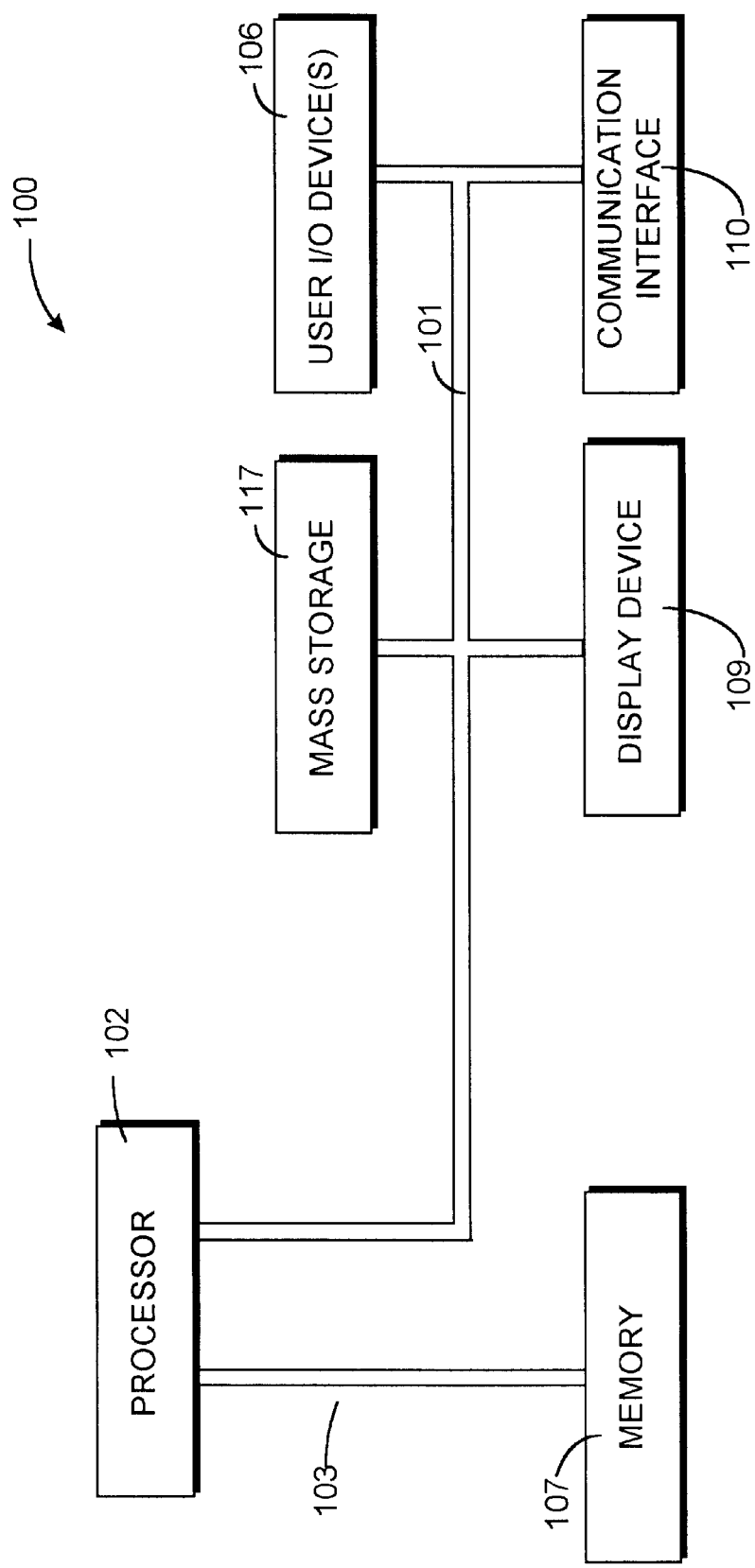
FIG. 1 shows computer system implementing the procedure and apparatus in accordance with the present invention.

FIG. 1 illustrates in block diagram form a computer system incorporating an apparatus and system in accordance with the present invention. Processor architectures and computing systems are usefully represented as a collection of interacting functional units as shown in FIG. 1. These functional units perform the functions of fetching instructions and data from memory, processing fetched instructions, managing memory transactions, interfacing with external I/O and displaying information.

FIG. 1 shows a typical general purpose computer system 100 incorporating a processor 102 and using both an application program and an operating system executing in processor 102. Computer system 100 in accordance with the present invention comprises an system bus 101 for communicating information, processor 102 coupled with bus 101 through input/output (I/O) devices within processor 102. Processor 102 is coupled to memory system 107 using a memory bus 103 to store information and instructions for processor 102. Memory system 107 comprises, for example, one or more levels of cache memory and main memory in memory unit 107. It should be understood that some cache memory is included on-chip with processor 102 in most applications in addition to cache and memory in memory system 107.

User I/O devices 106 are coupled to bus 101 and are operative to communicate information in appropriately structured form to and from the other parts of computer 100. User I/O devices may include a keyboard, mouse, magnetic or tape reader, optical disk, or other available I/O devices, including another computer. Mass storage device 117 is coupled to bus 101 and may be implemented using one or more magnetic hard disks, magnetic tapes, CD ROMs, large banks of random access memory, or the like. A wide variety of random access and read-only memory technologies are available and are equivalent for purposes of the present invention. Mass storage 117 includes computer programs and data stored therein. Some or all of mass storage 117 may be configured to be incorporated as part of memory system 107.

The present invention is particularly useful in operating systems where O/S threads are not preemptable. However, operating systems with preemptable threads can be made to work with the present invention by forcing only one thread at a time to execute. Moreover, the present invention can be used on operating systems that handle both preemptive and non-preemptive threads on a task-by-task basis.

A primary method for thread synchronization in many software languages (including JAVA programming language) is a monitor and lock paradigm. Although the present invention simplifies this locking process, the functionality achieved by the present invention must meet the language specifications so that the threads behave in a predictable manner. A lock operation behaves by first attempting to obtain a lock on a specified object (e.g., the object x in the examples herein). The lock operation will prevent further thread execution until the lock operation is completed (i.e., a lock is obtained). Only after the lock operation completes are the statements in the body of the synchronized method executed. When execution of all the statements in the body of a given thread are completed or the thread is otherwise terminated, an unlock operation is performed on the same lock.

It should be noted that the O/S overhead associated with the locking mechanism of the prior art can, of course, be avoided simply by not locking any objects, or locking as few objects as possible. However where any two methods access a single object or objects, it is essential to use the locking mechanism. The present invention is directed to a method for efficiently implementing the locking mechanism specified in the application to provide expected application behavior.

Where only one thread of a group of synchronized threads can be executing at a time, as shown in the example of FIG. 2, there is not, in general, a need to create associated monitor data structures when an object is locked. Likewise, where multiple threads can be running, but none can preempt the execution of another, monitor data structures are not generally needed. In these circumstances, the monitor data structures will only be needed when an executing thread is blocked for some time in a manner that is not known to the application itself.

FIG. 2 diagramatically shows a thread 200 generated in accordance with the present invention. Each software application comprises a collection of tasks directed to implement particular application behavior. Each task is in turn implemented by a plurality of threads such as thread 200 shown in FIG. 2. Each thread issues a stream of use, assign, lock, and unlock operations as dictated by the semantics of the program it is executing. Each atomic operation is represented in FIG. 2 by a box in thread 200.

Of particular interest in the understanding of the present invention a locking operations indicated by a "L", unlocking operations indicated by a "U" and blocking operations indicated by a cross through the operation box. For ease of reference a blocking operation is indicted by a series of operation boxes to indicate duration of the blocking, however, it should be understood that in practice is it is a single operation that blocks for the entire duration. Other operations are generically indicated by blank operation boxes, but these may include a wide variety of operations. Thread 200 may include any number of atomic operations from fewer than ten operations up to several hundred operations, or thousands of operations in an essentially single threaded task. The ellipses in FIG. 2 indicate that any number of non-blocking and blocking operations may be included in a typical thread 200.

In a multithreaded application or task, a plurality of threads 200 are implemented to perform task behavior. In a accordance with the present invention, a multithreaded application is caused to execute in a "serial" fashion meaning that the threads are not preemptable. As described above, this may be imposed by the operating system.

In cases where the operating system allows preemptable threads, the present invention operates to ensure that synchronized thread 0 and thread 1 shown in FIG. 3–FIG. 5 cannot execute concurrently. This is done, for example, by executing each synchronized method in a construct called a "critical section" such that program control enters a critical section before executing the synchronized method and no other thread can enter the critical section until the first thread to enter exits.

FIG. 3–FIG. 5 illustrates various situations during execution of synchronized threads labeled thread 0 and thread 1 and use the same nomenclature and graphical representations described above in reference to FIG. 2. FIG. 3 shows a situation in which thread 0, executes a number of operations, at least one of which accesses a shared object (not shown). Thread 0 is synchronized with thread 1 in FIG. 3 because thread 1, for example, accesses the shared object also. Thread 0 and thread 1 may be related as producer-consumer (i.e., one thread changes the shared object and the other thread uses the changed object) or the shared object may support only one access at a time and so thread 0 and thread 1 are synchronized to avoid conflict.

The lock and unlock operations in each thread are performed at any time during the thread execution upon entering and exiting a critical section of the thread (i.e., a method within a thread containing operations that access the shared object). A thread may execute more than one lock operation before executing an unlock operation (as shown in FIG. 2), but each lock must be followed by an unlock before the shared object is available to another thread. The programming language may allow explicit object locking/unlocking. Alternatively, in the case of the JAVA programming language a "synchronized" statement in the method implies the locking/unlocking operations.

Figure 7:
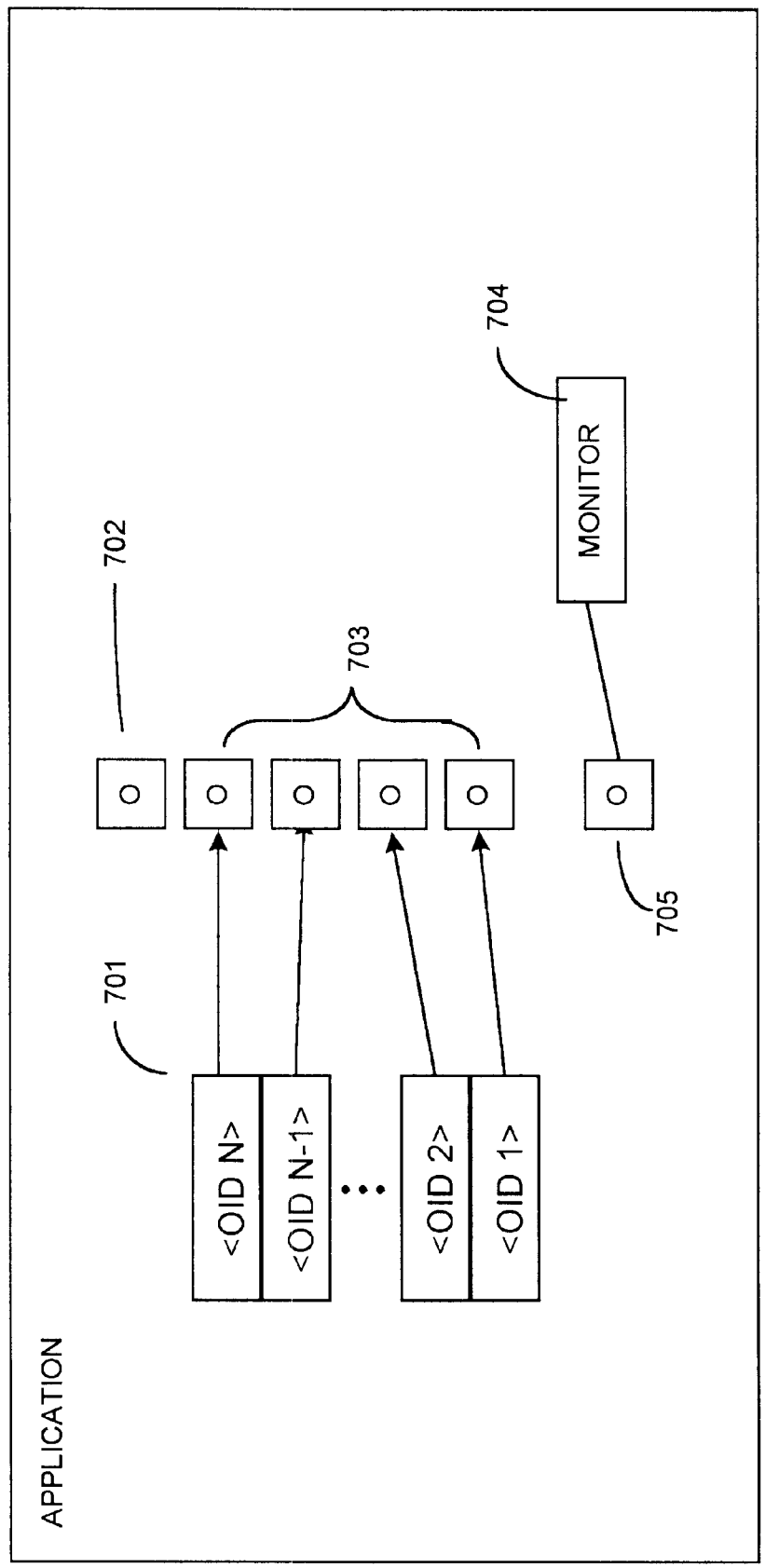
FIG. 7 shows data structures useful in implementation of the synchronization method in accordance with the present invention.

The lock operation is implemented in accordance with the present invention by pushing an object identification (OID) onto a special purpose stack (701 in FIG. 7). In the particular examples herein, the OID is an address of the shared object "x" in memory, although any OID that uniquely identifies a locked object or object is equivalent to the specific implementation. In contrast with the prior art, the lock operation does not cause the OS to allocate resources or create data structures to provide thread synchronization. A thread may acquire multiple locks in this manner, although only a single lock is shown for simplicity. Moreover, the thread may acquire multiple locks on the same object such that each acquired lock must be unlocked before the object becomes available for another thread.

Only when there is an actual monitor object does there need to be any appreciable code executed. This may block the executing thread, if the lock is already granted. A similar procedure may be executed at unlock time resuming a thread. Remembering that the existence of a monitor object is the exception rather than the rule, the entry sequence into a synchronized method is logically:

if(monitorExists(o) ) { monitorLockProcessing(o) } else { pushOnStack(o); } and an exemplary exit sequence is:

if(monitorExists(o) ) { monitorUnlockProcessing(o) } else { popStack(); } where monitorLockProcessing and monitorUnlockProcessing represent methods that call conventional lock/unlock operations.

It is important to note that the synchronization technique of present invention does not impose ordering constraints on the execution of thread 0 and thread 1. In other words, thread 1 may execute before thread 0 in any of the examples, and other mechanisms must be employed to constrain order. Examples of these mechanisms in the JAVA programming language include the wait( ), notify( ) and notifyAll( ) methods available in the JAVA programming language Threads class, although equivalents are available in other program languages.

In the example of FIG. 3, thread 1 and thread 0 are not CPU bound meaning that there are many available CPU cycles as compared to the number of operations that must be completed. In other words, neither thread 0 nor thread conflict with each other during their execution even though they access a shared variable and so are declared synchronized. The number of clock cycles required to execute most instructions is fairly predictable with the notable exception of memory operations, operations that require input/output (I/O), and instructions that wait for a specified event to occur, and the like. As shown in FIG. 3, thread synchronization is not really an issue because thread 1 and thread 0 do not execute concurrently. In this case, no O/S thread synchronization resources are needed (although they are nevertheless allocated in the prior art). A significant feature of the present invention is that the situation shown in FIG. 3 will not result in expenditure of O/S resources (i.e., creation of an O/S monitor object) even though the application specified synchronous threads.

FIG. 4 shows a related situation in which, even though thread 0 and thread 1 block while an object is locked during execution, they do not in fact conflict. The blocking in thread 0 occurs between operations 6 and 9 and may be caused by, for example, an I/O operation. At operation 5 a lock is placed on the shared object, hence, during the blocking phase the shared object remains locked. However, because thread 1 does not attempt to access the shared object until its own lock operation at operation 18, there is not conflict. As in the prior example, conventional processing would have expended OS resources to create monitor objects at time T5 even though none are in fact needed.

In accordance with a first embodiment of the present invention, the shared object's OID is pushed onto stack 701 (shown in FIG. 7) when thread 0 first blocks after the lock is in place (i.e., time 06), and the OID is removed when the thread resumes at time 10. This first embodiment results in minimal resource expenditure as the lock is implemented without a call to the OS by simply pushing an OID onto stack 701. In accordance with a second embodiment, the system delays pushing the OID onto stack 701 until 1) thread 0 resumes, and 2) the resumed thread is not the thread that last blocked. Hence, in the second embodiment a lock is never implemented in the example of FIG. 4 because thread 0 resumes before any other thread has created a lock.

In contrast, FIG. 5 shows an example including thread 0 that blocks at operation 6 during its execution. In FIG. 5, the blocking operation in thread 0 resumes at operation 18. At operation 7 thread 1 unblocks and resumes execution until operation 11 in which it attempts to obtain the lock on the shared object. In this case, the shared object is already locked by thread 0 and conventional lock/monitor processing is required to notify thread 1 when it can continue. In accordance with the present invention, thread 1 is blocked by the monitor object created during the time indicated by the bold-lined boxes 14–22. At time 23, thread 0 blocks again, but this time the shared object is unlocked, enabling thread 1 to resume.

In the first embodiment, allocation of thread synchronization data structures is delayed until operation at time 8 when thread 0 blocks. In accordance with the second embodiment, the OID is not placed on stack 701 until thread 1 unblocks at time 10. Hence, only when the lock/monitor resource is actually needed are the resources allocated. In the first embodiment, aside from the delayed allocation of resources, thread 0 and thread 1 execute in a manner substantially identical to prior synchronization methods. The first embodiment provides improved performance because synchronization resources are not allocated at all in situations resembling that shown in FIG. 3 and FIG. 4.

In the second embodiment, allocation of lock/monitor resources is postponed until a thread resumes. In this case, thread 1 is blocked by the application itself because it is now aware of the lock on the object because stack 701 is maintained in application or user memory space. When thread 1 resumes at time 10, it determines if it was or was not the last thread that blocked without a call to the O/S. In FIG. 5, thread 1 was not the last thread that blocked, hence, monitor objects are required to synchronize thread 1 with thread 0. In the example of FIG. 4, however, when thread 0 resumes it was the last thread that blocked, hence, monitor resources are not required. The longer it is possible to delay allocation of the synchronization resources the more likely it becomes that one of the conflicting threads will unlock the shared object and synchronization will be unnecessary.

Another advantage of the present invention is that monitor resources can be implemented by without involving operating system resources. As described in reference to FIG. 5, the unblocking of thread 1 at operation 10 can be handled without the OS because the information that the shared object is locked is held in application memory space. While the present invention can be implemented using conventional OS synchronization resources, it is desirable to implement the monitor object in application memory space to avoid the tens or hundreds of operations that may be required to implement the monitor objects in kernel memory space using OS synchronization resources.

Figure 6:
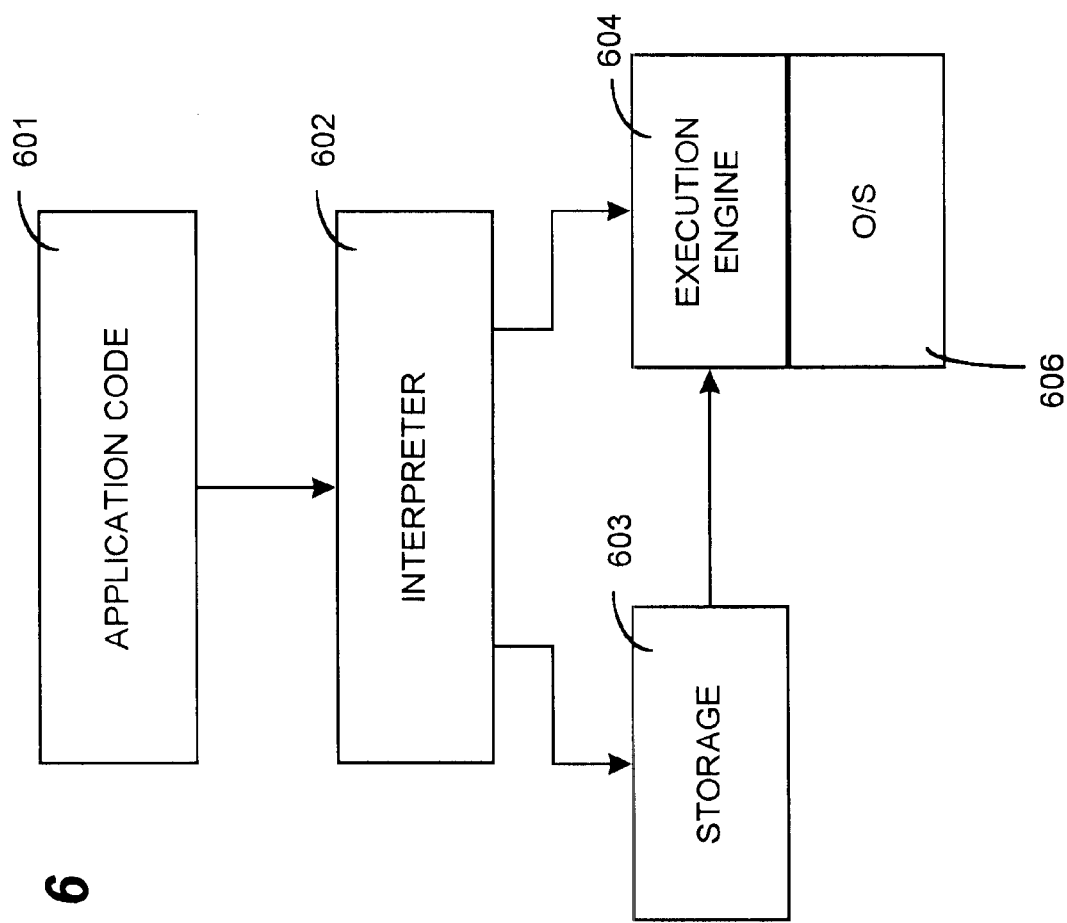
FIG. 6 shows an exemplary structure for implementing the synchronization method in accordance with the present invention.

FIG. 6 shows fundamental software or hardware implemented devices that implement the present invention. Computer system 100 (shown in FIG. 1) executes application code 601 using an interpreter 602. Application code 601 includes single threaded or multithreaded code in a conventional language such as the JAVA programming language. Interpreter 602 receives the application code and generates executable instructions that can be executed by execution engine 604. The executable instructions may include calls to OS 606, or may manipulate data in memory 107 directly. Interpreter 602 may be implemented in the form of a compiler that is operable prior to run time (i.e., at compile time) or operable at run time such as a just-in-time compiler provided with the JAVA virtual machine. The executable instructions from interpreter 602 may also be stored in storage 603 (e.g., magnetic media, optical media and the like) for later execution by execution engine 604 at run time.

Referring to FIG. 7, a plurality of objects 702, 703, and 705 are shown. Objects 703 are locked by a corresponding entry in stack 701. In contrast, object 705 is locked by a monitor object 704 created in a conventional fashion. The fact that an object is locked and the number of times it is locked is recorded by execution engine 604 (shown in FIG. 6) by pushing the address of the object (indicated as object ID or OID in FIG. 7) onto stack 701 at lock time. The entry is popped from stack 701 at unlock time and the object associated with the popped OID becomes an unlocked object 702. In this way, if the thread does not block while an object is locked, there is nothing more than needs to be done to ensure thread synchronization. If, however, the thread does block then the objects on stack 701 can be allocated monitor data structures 704 that are then used in a traditional way and stack 701 emptied.

As noted above, on the rare occasions that real lock/monitor data structures are created they can be implemented without the involvement of operating system 606. Memory 107 is allocated into application or user memory space 701 and kernel or OS memory space 702.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A method for execution in a processor having a plurality of threads executing thereon, the threads including synchronized operations that refer to at least one shared object, wherein the shared object is identified by an object identification (OID), the method comprising the steps of:

selecting a first thread of the plurality of threads including a synchronized operation for execution;

upon entering the selected thread, indicating that the at least one shared object should be locked by pushing the OID of the at least one shared object onto a lock stack accessible to all of the plurality of threads;

executing the synchronized operations defined by the selected thread; and removing the indication by pushing the OID from the lock stack.

2. The method of claim 1 wherein during the step of executing the operations defined by the selected thread the selected thread blocks, and the method further comprises a step of locking the at least one shared object after the selected thread blocks.

3. The method of claim 2 further comprising the steps of creating an instance of a monitor object corresponding to the shared object.

4. The method of claim 3 wherein the monitor object comprises a queue header, a counter, and an owner field identifying the selected thread.

5. The method of claim 3 wherein the step of locking comprises creating the monitor object in application memory space.

6. The method of claim 4 wherein the step of locking comprises creating the monitor object in kernel memory space.

7. The method of claim 2 wherein the step of locking further comprises:
   determining when the selected thread blocks; and
   performing the locking operation in response to the determining step.

8. The method of claim 2 wherein the step of locking further comprises:
   determining when the selected thread resumes after the block; and
   performing the locking operation only if one other of the threads including a synchronized operation has blocked since the selected thread blocked.

9. The method of claim 1 further comprising the steps of:
   selecting a second thread for execution, wherein the second thread includes an operation synchronized with the synchronized operation of the first thread;
   upon entering the second thread, determining whether the shared object is locked.

10. The method of claim 9 wherein when it is determined that the shared object is locked the method further comprises the steps of creating a monitor object associated with the shared object to determine when the shared object is unlocked; and
    executing the operations defined by the second thread after it is determined that the shared object is unlocked.

11. The method of claim 9 wherein when it is determined that the shared object is unlocked the method further comprises the steps of indicating that the shared object should be locked by pushing its OID onto the lock stack; and
    executing the operations defined by the second thread; and
    removing the indication by pushing the OID from the lock stack.

12. A computer system for executing an application comprising a plurality of synchronized threads of execution, wherein each synchronized thread refers to at least one object identified by an object identification (OID) that is shared among a plurality of synchronized threads, the computer system comprising:
    a processor;
    a memory coupled to the processor;
    a multithreading operating system that supports multiple threads of execution in a shared address space of the memory;
    a lock stack in the memory, the lock stack comprising a plurality of entries sized to hold an OID, the lock stack being accessible to all of the plurality of synchronized threads;
    an instruction interpreter executing in the processor and coupled to receive a selected one synchronized thread and cause the selected thread to execute on the processor, wherein upon entering the selected thread the instruction interpreter indicates that the shared object should be locked by pushing its OID onto a lock stack and upon exiting the selected thread the instruction interpreter removes the indication by pushing the OID from the lock stack.

13. The computer system of claim 12 further comprising:
    a thread block indicator operating within the processor to signal when the selected thread blocks during execution; and
    object locking devices operating within the processor and responsive to the thread block indicator to lock the shared object identified by the OID in the lock stack.

14. The computer system of claim 12 wherein the object locking devices comprise an instance of a monitor object corresponding to the shared object wherein the monitor object includes a queue header, a counter, and an owner field identifying the selected thread.

15. The computer system of claim 14 wherein the monitor object is instantiated in an application memory space of the memory.

16. The computer system of claim 14 wherein the monitor object is instantiated in a kernel memory space of the memory.

17. The computer system of claim 14 further comprising:
    a thread release indicator operating within the processor to signal when the selected thread releases from a block condition during execution; and
    object locking devices operating within the processor and responsive to the thread block indicator to lock the shared object identified by the OID in the lock stack only if another of the synchronized threads has blocked since the selected thread blocked.

18. A computer program product comprising:
    a computer usable medium having computer readable code embodied therein for synchronized thread execution in a multithreaded processor, wherein each synchronized thread refers to at least one object identified by an object identification (OID) that is shared among a plurality of synchronized threads, the computer program product comprising:
    computer program devices operating in the computer system and configured to cause a computer to select one of the synchronized threads for execution;
    computer program devices operating in the computer system and configured to cause a computer to indicate that the shared object should be locked by pushing its OID onto a lock stack upon entering the selected thread, the lock stack being accessible by all of the plurality of synchronized threads;
    computer program devices operating in the computer system and configured to cause a computer to execute the operations defined by the selected thread; and
    computer program devices operating in the computer system and configured to cause a computer to remove the indication by pushing the OID from the lock stack.

19. The computer program product of claim 18 further comprising:
    computer program devices configured to cause a computer to lock the shared object after the selected thread blocks.

20. The computer program product of claim 19 further comprising:
    computer program devices configured to cause a computer to determine when the selected thread blocks; and
    computer program devices configured to cause a computer to perform the locking operation in response to the determining step.

21. The computer program product of claim 19 further comprising:
    computer program devices configured to cause a computer to determine when the selected thread resumes after the block; and
    computer program devices configured to cause a computer to perform the locking operation only if another of the synchronized threads has blocked since the selected thread blocked.

22. The computer program product of claim 18 further comprising:

computer program devices configured to cause a computer to create an instance of a monitor object corresponding to the shared object wherein the monitor object comprises a queue header, a counter, and an owner field identifying the selected thread.

23. The computer program product of claim 18 further comprising:

computer program devices configured to cause a computer to create a monitor object associated with a shared object, the shared object being identified by an object identifier (OID), the monitor object comprising state information and methods to determine when the shared object is unlocked if the shared object is locked;

computer program devices configured to cause a computer to determine whether the shared object is locked upon entering the second thread;

computer program devices configured to cause a computer to create a monitor object associated with the shared object to determine when the shared object is unlocked if the shared object is locked;

computer program devices configured to cause a computer to indicate that the shared object should be locked by pushing its OID onto the lock stack if the shared object is unlocked;

computer program devices configured to cause a computer to execute the operations defined by the second thread; and computer program devices configured to cause a computer to remove the indication by pushing the OID from the lock stack.

24. A computer data signal embodied in a carrier wave comprising:

a first code portion comprising code configured to cause a computer to create a monitor object associated with a shared object, the shared object being identified by an object identifier (OID), the monitor object comprising state information and methods to determine when the shared object is unlocked if the shared object is locked;

a second code portion comprising code configured to cause a computer to indicate that the shared object should be locked by pushing its OID onto the lock stack if the shared object is unlocked, the lock stack being accessible by the plurality of threads;

a third code portion comprising code configured to cause a computer to execute the operations defined by the second thread; and a fourth code portion comprising code configured to cause a computer to remove the indication by pushing the OID from the lock stack.

* * * * *